United States Patent [19]
Wells et al.

[11] Patent Number: 5,354,157
[45] Date of Patent: Oct. 11, 1994

[54] DEVICE FOR CONNECTING A SHANK TO A PROBE

[75] Inventors: Peter J. Wells, Stonehouse; Andrew G. Butter; Brian C. R. Henning, both of Bristol, all of United Kingdom

[73] Assignee: Renishaw plc, Gloucestershire, United Kingdom

[21] Appl. No.: 161,800

[22] Filed: Dec. 6, 1993

[30] Foreign Application Priority Data

Dec. 12, 1992 [GB] United Kingdom ............ 9225994.4

[51] Int. Cl.⁵ .......................... B23C 9/00; G01B 7/28
[52] U.S. Cl. ....................... 409/133; 33/559; 33/572; 408/2; 409/127; 409/134
[58] Field of Search ............ 409/127, 126, 133, 134, 409/231; 408/2, 710; 33/503, 556, 559, 572

[56] References Cited

U.S. PATENT DOCUMENTS

| | | |
|---|---|---|
| 4,447,958 | 5/1984 | Tanaka ................... 33/174 |
| 4,510,693 | 4/1985 | Cusack . |
| 4,752,166 | 6/1988 | Lehmkuhl ............ 409/127 |
| 4,778,313 | 10/1988 | Lehmkuhl ............ 409/127 |
| 5,040,931 | 8/1991 | Spivey et al. . |

FOREIGN PATENT DOCUMENTS

| | | |
|---|---|---|
| 0384029 | 8/1990 | European Pat. Off. . |
| 2927525 | 1/1980 | Fed. Rep. of Germany . |
| 3422103 | 12/1984 | Fed. Rep. of Germany . |
| 3826146 | 2/1990 | Fed. Rep. of Germany . |
| 2502325 | 9/1982 | France . |
| WO90/04149 | 4/1990 | PCT Int'l Appl. . |
| 2025073 | 7/1978 | United Kingdom . |
| 86/04535 | 8/1986 | World Int. Prop. O. . |

Primary Examiner—Daniel W. Howell
Attorney, Agent, or Firm—Oliff & Berridge

[57] ABSTRACT

A connecting device for connecting a shank 16 to a measuring probe 18 is disclosed, to enable the probe 18 to be incorporated on a machine tool for the purpose of tracing a contour of a model. The device includes first and second parts (20,22) connected to the shank and the probe respectively, retained together by a connecting bolt 50 which is spring-loaded by means of Belville washers 56. An arm 60 extends from the second part to engage the housing 14 of the spindle 10, and thereby prevent rotation of the spindle shaft 12. In the event of accidental spindle start-up the two parts 20,22 may rotate relative to each other (the shank rotating with the shaft 12); a thrust bearing 42 enabling sliding of the two parts.

8 Claims, 3 Drawing Sheets

DEVICE FOR CONNECTING A SHANK TO A PROBE

BACKGROUND OF THE INVENTION

1. Field of the Invention

The present invention relates to a device for connecting a shank, retainable in the movable arm of a machine tool, to a probe, which may be carried on the movable arm to enable the machine to inspect a workpiece or model.

2. Description of Related Art

In our co-pending European Patent Application No. 93306645.8, we disclose a system in which a measuring or analogue probe is provided on a machine tool to enable the machine to trace or scan the contour of a model or other workpiece. A particular feature of this system is the ability to install the measuring probe on the machine without the need for significant modification to the machine. The connecting device of the present invention provides a further development which enables the operative installation of a probe (such as a measurement or analogue probe) on the spindle of a machine tool without the need for significant modification.

In particular, the connecting device of the present invention enables a probe to be installed on the rotatable spindle of a machine tool in a manner that provides rotational stability of the spindle (which is important in the case of a measuring probe, for example, in order to ensure that the measuring axes of the probe remain static), and which nonetheless provides a protection mechanism to prevent damage to the probe or the machine in the event of accidental start-up of the spindle while the probe is connected thereto.

SUMMARY OF THE INVENTION

The present invention provides a device for connecting a shank, which is retainable in the rotating shaft of a spindle on a machine tool, to a probe for inspecting the position or contour of a surface, the device including a first part fixable to the shank, a second part fixable to the probe, means for providing a retaining force to urge said first and second parts into stable engagement and means for permitting relative rotation of said first and second parts about an axis extending in the direction of the retaining force between the two parts, and wherein an arm on the second part is engageable with the spindle housing relative to which said shaft is rotatable, in order to rotationally constrain movement of the second part and thus the probe.

The engagement of the arm with the spindle housing prevents rotation of the probe on machine tools where no mechanical spindle lock is provided, while the ability of the first and second parts of the device to rotate relative to each other prevents damage to the device, the probe, or the machine in the event of an accidental spindle start-up.

BRIEF DESCRIPTION OF THE DRAWINGS

Embodiments of the invention will now be described, by way of example, and with reference to the accompanying drawings in which.

DESCRIPTION OF PREFERRED EMBODIMENTS

Figure 1:
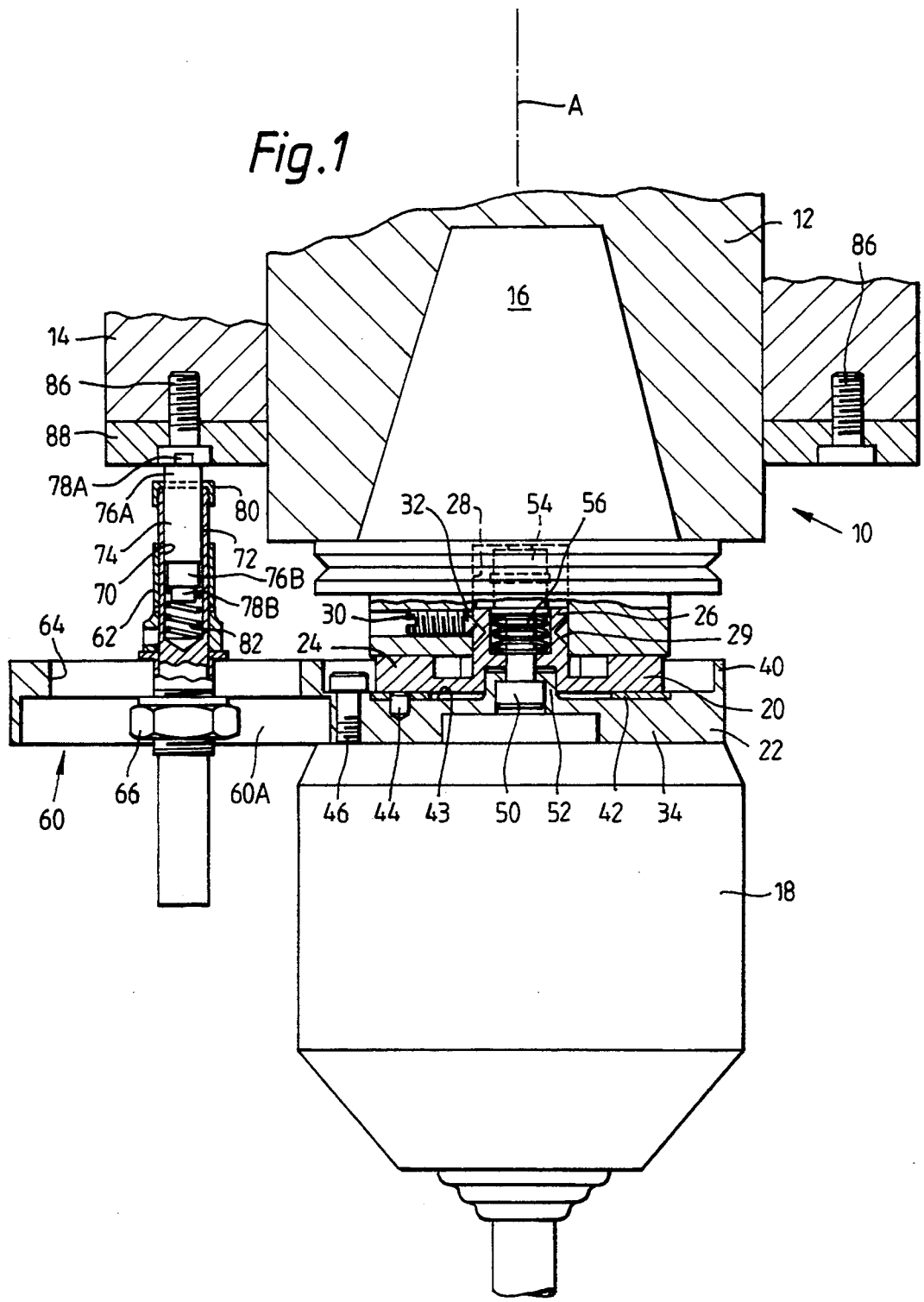
FIG. 1 shows a section through a shank and a measuring probe retained together with the device of the present invention.

Referring now to FIG. 1, a spindle 10 has a rotatable shaft 12 journalled within a housing 14. The spindle 10 is linearly movable relative to a table of the machine (not shown) on which a model, or some other workpiece whose contour is to be traced is supported. A frusto-conical shank 16 is retained in a socket in the shaft 12 by a mechanism which retains a pull-up stud (not shown) provided on the rear of the shank. The shank 16 carries a measuring or analogue probe 18. The particular type of measuring probe is not germane to the present invention and may, for example, be a probe of the type disclosed in our prior published International Application No. WO 90/04149. An intermediate connecting device is provided for connecting the shank 16 to the probe 18, which device constrains rotation of the probe relative to the spindle housing 14, and enables rotation of the probe relative to the spindle shaft 12 in the event of accidental start-up of the machine. The intermediate connecting device comprises a first part 20 which may be fixed to the shank 16, and a second part 22 which may be fixed to the probe 18. The first part 20 includes a first circular plate 24 from which a cylindrical boss 26 projects into a corresponding bore 28 provided coaxially within the shank 16. The boss 26 has a circumferentially extending U-shaped groove 29 in its outer surface which is engaged by a retaining bolt 30 extending radially in the body of the shank 16 and whose conical end face 32 engages the groove 29 to urge the first part 20 axially against the shank 16. The second part 22 of the connecting device is also formed as a second substantially circular plate 34 having an upwardly extending flange 40 which extends around the first part of the connecting device when the tool 18 is connected to the shank 16. The second circular plate 34 supports a thrust bearing 42 in the form of an annular pad. The thrust bearing 42 is retained on the second circular plate 34 in an annular recess 43, and a dowel 44 restrains rotation of the bearing 42. The second part 22 is connected to the probe by means of three equi-spaced bolts 46.

Engaging means are provided for urging the first and second parts 20,22 into engagement, and in this embodiment the engaging means is provided in the form of a retaining bolt 50, which extends through the centre of a cylindrical boss 52, provided in the centre of the plate 34. The shank of the bolt 50 extends through the centre of cylindrical boss 26, provided on the first part 20, and nuts 54 provided on the shank of the bolt 50 compress a stack 56 of Belville washers against an internal ledge 58 provided in the boss 26. This arrangement urges the first part 20 against the thrust bearing 42 provided on the second part 22; the frictional engagement between the thrust bearing 42 and the first part preventing rotation in normal operation while simultaneously enabling a stable retention of the probe and the shank.

Figure 2:
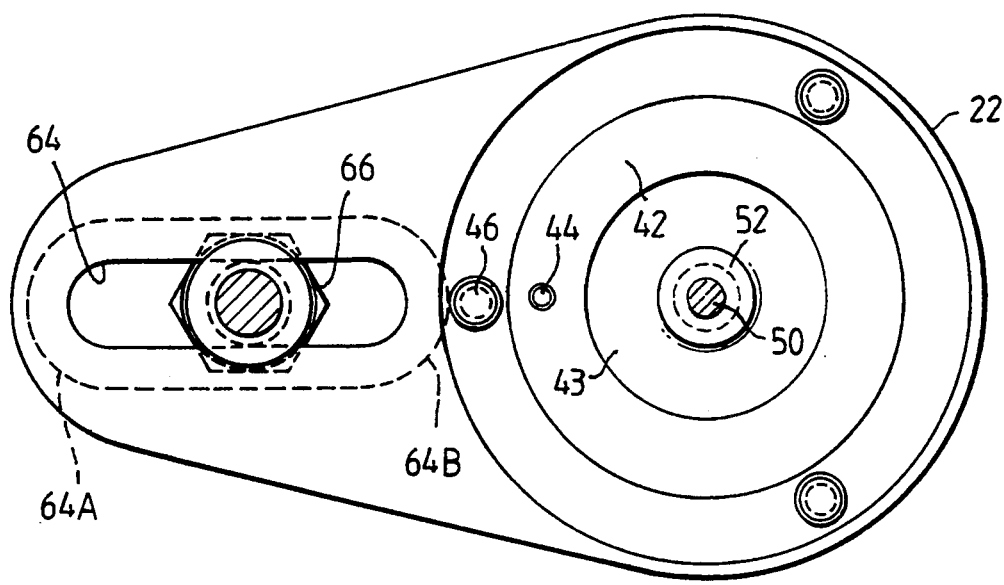
FIG. 2 is a plan view on II—II in FIG. 1.

The second part 22 has a radially extending arm 60 having a first limb 60A, which extends radially with respect to the axis A and a second limb in the form of a locating pin 62 adjustably supported on the first limb 60A and extending axially with respect to the axis A. The pin 62 is retained within a radially extending slot 64 which provides adjustment of the position of the pin 62 between the two positions 64A,B shown in FIG. 2. The position of the pin in the slot 64 is fixed by retaining nut 66. The pin 62 has a bore 70 which supports a spring-loaded plunger 72. The plunger 72 has a central body 74 from each end of which a cylindrical boss 76A,B extends; each boss 76A,B supports a hexagonal spigot 78A,B adapted to engage the head of an allen bolt. The spigots 78A,B have different diameters to enable engagement of different size allen bolts by reversal of the orientation of the plunger 72 within the bore 70. The plunger 72 is retained within the bore 70 by an end cap 80 provided on the end of the pin 62, which engages the body 74. The cap 80 has a central aperture through which a spigot 78A,B is urged by the action of biasing spring 82.

Rotational constraint of the probe relative to the spindle housing 14 is provided by engagement of one of the spigots 8A,B in the head of allen bolts 86 typically provided in the nose 88 of the spindle housing 14. Where the machine on which the probe is to be used does not have such allen bolts, a suitable aperture may be drilled out of the spindle nose without great difficulty or damage to the machine.

The arm 60 thus provides rotational constraint for the probe relative to the spindle housing, and thus enables the use of a measuring or analogue probe on a machine tool which does not have a mechanical spindle lock without the need to modify the machine in order to provide such a lock. Furthermore, should the spindle shaft 12 be accidentally set into rotation relative to the housing 14 while a measuring probe is connected thereto, the shaft 16 will rotate within the spindle housing 14 and with the first part 20 of the connecting device. However, the second part 22 of the connecting device and the probe will remain stationary by virtue of the engagement of the arm 60 with the spindle housing 14; the first part 20 of the connecting device will thus rotate relative to the second part of the connecting device; the thrust bearing 42 enabling this.

During accidental rotation between the probe and shank, friction at the thrust bearing will be high. However, this device is intended only as a safety device to prevent damage to the machine, the probe, or the operator in the event of accidental spindle start-up. In the event that this has occurred, the probe should be re-datumed, since both its translational and rotational position relative to the shank 16, and thus the shaft 12 will have changed significantly as a result of this relative rotation. The translation of the probe may be caused by wear, frictional effects or as a result of the heat generated during the relative rotation.

Figure 4:
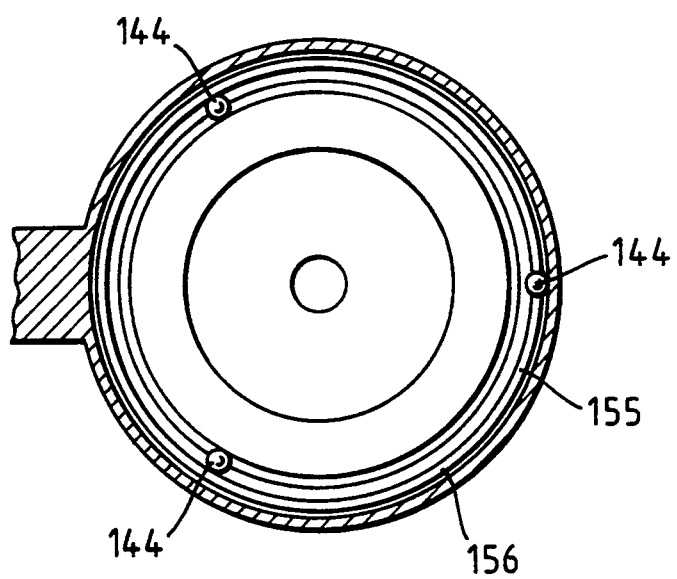
FIG. 4 is a section on IV—IV in FIG. 3.
Figure 3:
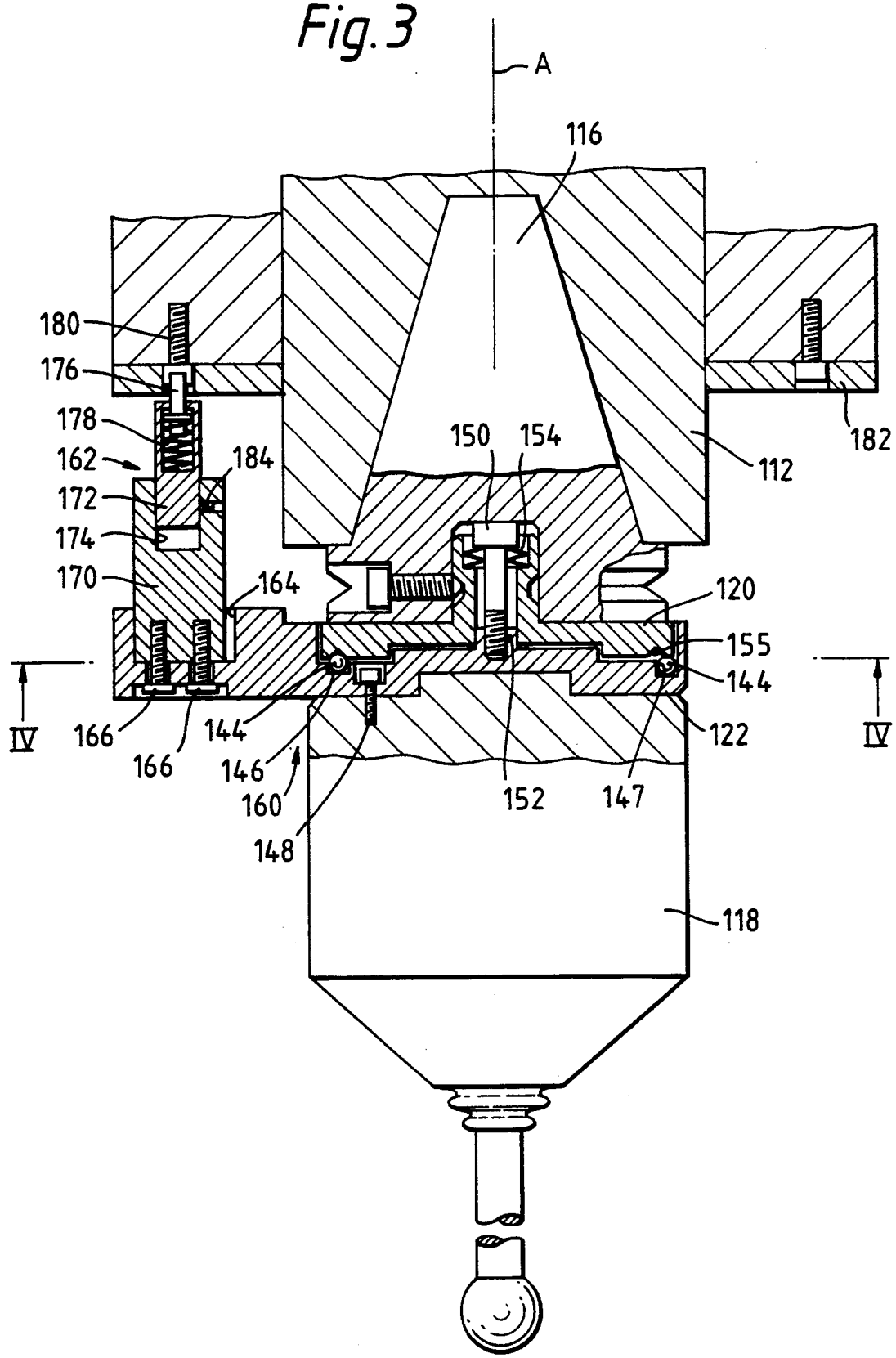
FIG. 3 shows a modified device.

A modification will now be described with reference to FIGS. 3 and 4. As with the first embodiment, the intermediate connecting device comprises a first part 120 which may be fixed to the shank 116, and a second part 122 which may be fixed to the probe 118. The second part 122 supports three equi-spaced balls 144, two of which lie in recesses 146 having a depth equal to approximately half of the diameter of the balls 144, and a third of which lies in a recess 147 whose depth is fractionally smaller than the diameter of the ball. The second part 122 is connected to the probe by means of three equi-spaced bolts 148.

A retaining bolt 150, supported in a boss 152 on the first part 120, and a series of serially stacked Belville washers 154, which bear between the bolt 150 and an internal ledge 156 provided within the boss on the first part, cause two of the balls 144 to seat in a circumferentially extending v-groove 155 on the first part 120, and the third of the balls 144 to bear against a planar surface 156 on the first part 120 which extends around the circumferentially extending v-groove 155. This arrangement provides a quasi-kinematic support of the first part 120 on the second part 122. The remaining unconstrained degree of freedom being rotation about the axis A of the probe 118 and shank 116.

The second part 122 of the device has a first limb, in the form of a radially extending arm 160 and a second limb in the form of an adjustably supported axially extending locating pin 162. The pin 162 is retained on the arm 160 within a recess 164, with sufficient clearance to enable the position of the pin in a direction radial to the axis A to be adjusted. The position of the pin 162 may be fixed relative to the arm 160 by a pair of retaining bolts 166 once the correct radial adjustment has been obtained. The pin 162 includes a base 170 and a plunger member 172 retained in a bore 174 provided in the upper end of the base 170. The plunger member includes a plunger pin 176 biased upwardly by a spring 178 into engagement with the inner recess of an allen bolt 180 which secures the spindle nose 182 to the remainder of the spindle housing. The plunger housing is retained in the base by means of a grub screw 184.

As with the first embodiment, the arm provides rotational constraint for the probe relative to the spindle housing, and thus enables the use of a probe on a machine tool which does not have a mechanical spindle lock, without the need to modify the machine in order to provide such a lock. In the event of accidental spindle starting, the first part 120 of the connecting device will rotate relative to the second part 122 of the connecting device; two of the balls 144 sliding around the v-groove 155, while the third ball slides around the planar surface 156 surrounding the v-groove 155.

We claim:

1. A device for connecting a shank which is retainable in the rotating shaft of a spindle on a machine tool to a probe for inspecting the position or contour of a surface, the device including a first part fixable to the shank, a second part fixable to the probe, means for providing a retaining force to urge said first and second parts into stable engagement and means for permitting relative rotation of said first and second parts about an axis extending in the direction of the retaining force between the two parts, and wherein an arm on the second part is engageable with the spindle housing relative to which said shaft is rotatable, in order to rotationally constrain movement of the second part and thus the probe.

2. A device according to claim 1 wherein said arm includes a first limb extending radially with respect to the axis, and a second limb connected to said first limb, and extending from said first limb in a direction parallel to the axis.

3. A device according to claim 2 wherein means are provided for adjusting the radial position of the second limb relative to the first limb.

4. A device according to claim 3 wherein a spring-loaded plunger is provided on the second limb at an end thereof distal to its connection with the first limb.

5. A machine tool comprising:
a table for supporting a workpiece,
a spindle, the spindle and table being movable linearly relative to each other, the spindle having a housing and a shaft within the housing, the shaft being rotatable relative to the housing;

a probe for inspecting the position or contour of a surface, the probe being connected to a shank retained on the shaft of the spindle;

a connecting device for connecting the probe and shank including a first part fixable to the shank, a second part fixable to the probe, means for providing a retaining force to urge said first and second parts into stable engagement and means for permitting relative rotation of said first and second parts about an axis extending in the direction of the retaining force between the two parts, and wherein an arm on the second part is engageable with the spindle housing, in order to rotationally constrain movement of the second part and thus the probe.

6. A machine according to claim 5 wherein said arm includes a first limb extending radially with respect to the axis, and a second limb connected to said first limb, and extending from said first limb in a direction parallel to the axis.

7. A machine according to claim 6 wherein means are provided for adjusting the radial position of the second limb relative to the first limb.

8. A machine according to claim 7 wherein a plurality of bolts are provided in said housing, each of said bolts including a head having a recess and wherein a spring-loaded plunger is provided on the second limb at an end thereof distal to its connection with the first limb, said plunger being adapted to sit in the recess of said bolt head.

* * * * *